the co-solvents of the invention comprise compounds,

United States Patent [19]

Henry

[11] 4,290,815

[45] Sep. 22, 1981

[54] USE OF CO-SOLVENTS IN AMINE N-OXIDE SOLUTIONS

[75] Inventor: Charles L. Henry, Asheville, N.C.

[73] Assignee: Akzona Incorporated, Asheville, N.C.

[21] Appl. No.: 111,290

[22] Filed: Jan. 28, 1980

[51] Int. Cl.$^3$ .............................. C08J 3/04; C08J 3/08; C08L 1/02
[52] U.S. Cl. ........................................ 106/203; 8/181; 8/196; 106/186
[58] Field of Search .................... 8/196, 181; 106/186, 106/203; 536/56

[56] References Cited

U.S. PATENT DOCUMENTS

| 2,980,490 | 4/1961 | Gulledge | 8/196 |
| 3,447,939 | 6/1969 | Johnson | 106/135 |
| 3,508,941 | 4/1970 | Johnson | 106/162 |
| 4,142,913 | 3/1979 | McCorsley et al. | 8/130.1 |
| 4,144,080 | 3/1979 | McCorsley | 106/186 |
| 4,145,532 | 3/1979 | Franks et al. | 536/56 |
| 4,196,282 | 4/1980 | Franks et al. | 536/56 |

OTHER PUBLICATIONS

Creely et al., *Journal of Polymer Science: Polymer Letters Ed.*, 16: 291–295, (1978).
Turbak et al., *A Critical Review of Cellulose Solvents Systems*, ACS Symposium, Series 58, ACS Washington, D.C. 1977, pp. 12–24.

*Primary Examiner*—Allan Lieberman
*Attorney, Agent, or Firm*—Francis W. Young; Jack H. Hall; H. Walter Haeussler

[57] ABSTRACT

This invention relates to the use of certain co-solvents in cellulose amine N-oxide solutions, which co-solvents increase the cellulose dissolution rate; lower the temperatures necessary to reasonably form a solution; lower the viscosity of the solution; provide solutions with improved color, amine oxide stability, and cellulose stability, provide a solution with improved flow characteristics; increase solution processability, e.g. wet spinning; permit the replacement of amine oxides by a less expensive co-solvent; and are recoverable and reusable in cellulose dissolution and processing.

The co-solvents of the invention comprise compounds, miscible with cellulose-dissolving amine N-oxides, containing primary, or combinations of primary and secondary, amino groups wherein the amino groups are bonded to alkyl, alicyclic, dialkyl ether or alkyl/alicyclic radical(s) and wherein the number of carbon atoms divided by the number of primary amino groups is approximately equal to or less than 4; or $$\#C/\#NH_2 \lesssim 4$$

and the number of primary amino groups divided by the number of secondary amine radicals is equal to or greater than 1; that is $$\#NH_2/\#NHR \geq 1.$$

10 Claims, No Drawings

USE OF CO-SOLVENTS IN AMINE N-OXIDE SOLUTIONS

BACKGROUND OF THE INVENTION

U.S. Pat. No. 4,145,532, and copending application Ser. No. 938,907, filed Sept. 1, 1978, disclose cellulose solutions and precipitated cellulose articles formed from a tertiary amine oxide solvent containing up to about 29% water. It is also disclosed that an organic co-solvent may be used in quantities up to about 25% by weight of the total solution as a less expensive diluent for the amine oxide as to lower the viscosity of the solution, if desired.

Copending application Ser. No. 938,906, filed Sept. 1, 1978, describes tertiary amine N-oxide solutions, with or without water, containing up to 20% of a compound which increase the pH of the solution. Examples of such compounds include primary, secondary and tertiary amines. The pH-adjusting compounds of said copending application are present in the initial stages of solution preparation to aid in dissolution of the cellulose but are not necessarily completely miscible with the components of the final solution and, in some cases, may not be retained completely in the final solution, whereas the co-solvents of the present invention are retained and are completely miscible with the components of the final solution. The amines employed in the present invention are not specifically disclosed in said copending application.

Creely et al, *Journal of Polymer Science: Polymer Letters Ed.*, 16: 291–295 (1978), describe polyamine complexes with cellulose, including complexes prepared from diethylenetriamine, N-(2-aminoethyl)-1,3-propanediamine, triethylenetetramine and bis(2-aminopropyl) amine.

Turbak et al, *A Critical Review of Cellulose Solvent Systems*, ACS Symposium, Series 58, ACS Washington, D.C., 1977, pp. 12–24, report the use of methylamine as a co-solvent with DMSO to dissolve cellulose.

DESCRIPTION OF THE INVENTION

This invention relates to the use of certain co-solvents in cellulose amine N-oxide solutions, which co-solvents increase the cellulose dissolution rate; lower the temperatures necessary to reasonably form a solution; lower the viscosity of the solution; provide solutions with improved color, amine oxide stability, and cellulose stability, provide a solution with improved flow characteristics; increase solution processability, e.g. fiber spinning; permit the replacement of amine oxides by a less expensive co-solvent; and are recoverable and reusable in cellulose dissolution and processing.

The co-solvents of the invention comprise compounds, miscible with cellulose-dissolving amine N-oxides, containing primary or combinations of primary and secondary amino groups wherein the amino groups are bonded to alkyl, alicyclic, dialkyl ether or alkyl/alicyclic group(s) and wherein the number of carbon atoms divided by the number of primary amino groups is approximately equal to or less than 4; or $\#C/\#NH_2 \lesssim 4$ and the number of primary amine groups divided by the number of secondary amine groups is equal to or greater than 1; or $\#NH_2/\#NHR \geq 1$ The co-solvents of the invention have a melting point below about 125° C. and preferably below about 100° C.; or at least are liquid within the solution environment of the invention at below about 125° C. and preferably below about 100° C. While the ability of the co-solvent to be in a liquid state at the appropriate temperature is controlling, preferably the co-solvent contains less than 25 and most preferably less than 15 carbon atoms.

The co-solvents of the invention are incorporated into the system primarily to modify the solution formation and processability of cellulose in tertiary amine oxide solvents.

The preferred compounds of the invention are polyamines consisting of C, H & N, containing 2 or more primary amino groups. Another preferred group of amines is polyamines containing 2 or more primary amino groups in which the ratio of primary amino groups to secondary amino groups is greater than 1.

The cellulose solution is prepared from an admixture comprising up to about 30% and preferably from 5% to about 20% by wt. of cellulose, an amine oxide/water solvent and a co-solvent, as described herein, wherein the ratio by weight of amine oxide to cellulose is greater than about 1.2 and preferably greater than 1.5; the weight ratio of co-solvent to amine oxide is greater than 0, preferably about 0.05 to about 10; the weight ratio of water to amine oxide is less than 0.4; and said solution is prepared at a temperature of less than about 125° C., and preferably less than about 100° C.

The above limits represent the parameters for diethylenetriamine, presently believed to be the most effective co-solvent within the described genus of co-solvents, when employed with N-methylmorpholine oxide or N,N-dimethylethanolamine oxide. The weight ratio of amine oxide to cellulose, the weight ratio of co-solvent to amine oxide for any other co-solvent/amine oxide combinations within the scope of this invention can be readily determined and will lie within the above described limits.

A principal use of the solutions of this invention is to form shaped cellulose articles. For economic reasons, it is preferred that the co-solvent be readily recoverable for recycling. When the shaped solution is contacted with a liquid process medium, e.g., an article precipitation medium such as water, it is preferred that the co-solvent be selected so as to have a boiling point ±15° C. as compared to the boiling point of the admixed process medium, to facilitate subsequent distillative separation of the co-solvent.

Where the use of low boiling (below about 60° C.) amine co-solvents is contemplated, it may be desirable to employ a pressurized system to prevent undesired co-solvent loss.

Examples of useful polyamines include 1,2-diaminopropane, 1,6-hexamethylene diamine, bis(aminomethyl)cyclohexanes, diethylenetriamine, dipropylenetriamine, 1,3-diaminopropane, 1,4-diaminobutane, 1,2,3,4-tetraaminobutane, N-(2-aminoethyl)-1,3-propanediamine, ethylenediamine and triethylenetetraamine.

An example of ether linkage-containing polyamines is di(aminoethyl) ether.

Examples of monoamino ethers include 2-methoxy ethyl amine.

Examples of monoamines include butyl amine (bp 76°–78° C.), propylamine (bp 49° C.), ethyl amine and methylamine.

The cellulose/tertiary amine N-oxide/water-cellulose solutions in which the co-solvents are employed in the process of the invention are formed by the process described in U.S. Pat No. 4,145,532 and co-pending application Ser. No. 938,907, filed Sept. 1, 1978, now U.S. Pat. No. 4,196,282, both of which are hereby incorporated by reference.

The tertiary amine oxides disclosed in the above applications, which may be used to advantage when employed in conjunction with water and the co-solvent in practicing the invention include N,N-dimethylethanolamine N-oxide (DMEAO), N,N-dimethylbenzylamine N-oxide, triethylamine N-oxide, N,N-dimethylcyclohexylamine N-oxide, N-methylmorpholine N-oxide (NMMO), N-methylhomopiperdine N-oxide and 2(2-hydroxypropoxy)-N,N-dimethyl-N-ethylamine N-oxide.

Preferred tertiary amine oxides, which may be used in practicing this invention, include N-methylmorpholine N-oxide, N,N-dimethylethanolamine N-oxide and N,N-dimethylcyclohexylamine N-oxide.

It is noted that the amine oxides contemplated by the invention are sometimes referred to as amine oxides. They are more properly termed "tertiary amine N-oxides".

As pointed out in the copending application and patent, the percentage range of water required in the solvent will vary with the tertiary amine oxide in the solvent.

The amount of co-solvent, employed in the present invention, is an amount sufficient to reduce the viscosity of the amine N-oxide/water-cellulose solution, but insufficient to cause precipitation of cellulose. The amount of co-solvent which can be employed will vary to some extent depending on the specific co-solvent and the specific amine-N-oxide employed. As pointed out above, the amount of co-solvent employed will also vary with the concentrations of the cellulose, water and amine oxide in the solution.

The minimum temperature at which the solutions are formed is not unduly critical so long as the temperature is a temperature at when the specific solvent/co-solvent system is a liquid. The rate of dissolution is increased with increasing temperature. The time necessary to obtain a solution is a function of the amount of cellulose, the temperature and the specific solvent/co-solvent combination employed.

The solutions of the invention can be formed generally by admixing the components.

In a preferred embodiment, the co-solvent is first contacted with the cellulose at ambient or slightly elevated temperatures, e.g. 50°–55° C. for a time sufficient to swell the cellulose. This swelled co-solvent containing mixture is then dissolved in an amine oxide/water solvent system in the usual manner. Alternatively, the mixture of co-solvent, amine oxide and water can be employed without a swelling period to directly form the cellulose solution.

The cellulose solutions of the invention are suitable for shaped article production such as by extrusion or spinning followed by coagulation in a non-solvent.

The following examples of the invention are considered illustrative rather than limiting. All parts and percentages are by weight unless otherwise specified. All temperatures are degrees Centigrade.

EXAMPLE 1

A series of solutions were prepared in the following manner

N-Methylmorpholine oxide (NMMO), cellulose (Buckeye V-68), water and diethylenetriamine (DETA) were weighed in a beaker on a balance and transferred into a 2CV Atlantic Research mixer, where it was stirred at 100 RPM at a temperature of 65°–140° C., depending on cellulose concentration, for a maximum of 30 min. Then the material was subjected to microscopic examination to determine if solution was obtained. The results are recorded in Table I.

The procedure above was repeated using N,N-dimethylethanolamine oxide (DMEAO), instead of NMMO and results are found in Table II.

TABLE I

NMMO - DETA - Cellulose - $H_2O$

DETA M. wt. 103.7
NMMO M. wt. 117.2

| Wt. % | | | | Mole % | | | | MOLE RATIO | TEMP. | TIME | |
|---|---|---|---|---|---|---|---|---|---|---|---|
| Cell. | A-O* | DETA | $H_2O$ | Cell. | A-O | DETA | $H_2O$ | NMMO cell. | C°. | MIN. | SOLUTIONS |
| 0.9 | 7.0 | 79.9 | 12.1 | 0.4 | 3.9 | 51.2 | 44.5 | 10.4 | 120 | 30 | No. Heavy fumes occurred. |
| 0.9 | 48.0 | 49.0 | 2.1 | 0.6 | 40.7 | 47.1 | 11.6 | 70.1 | 85 | 5–6 | Yes. Light in color. |
| 0.9 | 48.0 | 39.0 | 12.1 | 0.4 | 28.0 | 25.8 | 45.9 | 69.9 | 75 | 5–6 | Yes. Light in color. |
| 0.9 | 3.3 | 94.4 | 1.3 | 0.6 | 2.8 | 89.6 | 7.1 | 4.9 | 65–70 | 30 | No. |
| 0.9 | 8.3 | 89.5 | 1.2 | 0.6 | 7.0 | 85.6 | 6.8 | 12.3 | 65–70 | 5–6 | Yes. Light in color. |
| 1.9 | 3.3 | 93.4 | 1.4 | 1.1 | 2.8 | 88.7 | 7.4 | 2.4 | 65–70 | 30 | No. |
| 3.8 | 6.8 | 88.0 | 1.4 | 2.3 | 5.7 | 84.5 | 7.5 | 2.5 | 65–70 | 5–6 | Yes. Light in color |
| 4.7 | 8.3 | 85.6 | 1.4 | 2.9 | 7.0 | 82.3 | 7.8 | 2.4 | 65–70 | 10 | Yes. Light in color. |
| 5.3 | 14.2 | 74.5 | 6.0 | 2.7 | 10.0 | 59.6 | 27.7 | 3.7 | 65–70 | 10 | Yes. Light in color. |
| 5.3 | 53.1 | 23.3 | 18.3 | 1.9 | 26.2 | 13.1 | 58.9 | 13.8 | 65–70 | 30 | No. |
| 10.1 | 17.9 | 70.5 | 1.6 | 6.3 | 15.5 | 69.4 | 8.8 | 2.5 | 65–70 | 10 | Yes. Light in color. |
| 10.1 | 16.8 | 71.6 | 1.6 | 6.3 | 14.5 | 70.3 | 8.9 | 2.3 | 65–70 | 10 | Yes. Light in color. |
| 10.1 | 16.8 | 66.1 | 7.1 | 5.0 | 11.5 | 51.7 | 31.8 | 2.3 | 65–70 | 30 | No. Opaque. |
| 10.1 | 13.4 | 70.5 | 6.0 | 5.2 | 9.6 | 57.3 | 28.1 | 1.8 | 65–70 | 30 | Almost. Slightly opaque; gel like. |
| 10.1 | 33.5 | 44.1 | 12.4 | 4.3 | 19.5 | 29.2 | 47.0 | 4.6 | 65–70 | 30 | No. Opaque. |
| 10.6 | 17.7 | 70.0 | 1.7 | 6.7 | 15.3 | 68.6 | 9.4 | 2.3 | 65–70 | 10 | Yes. Light in color. |
| 11.9 | 24.0 | 58.0 | 6.0 | 6.3 | 17.4 | 47.9 | 28.5 | 2.8 | 90 | 10–12 | Yes. Light in color. |
| 14.8 | 15.8 | 67.5 | 1.8 | 9.3 | 13.7 | 66.6 | 10.4 | 1.5 | 75–80 | 30 | Almost. Slightly opaque. |
| 14.3 | 15.9 | 62.7 | 7.1 | 7.2 | 11.1 | 49.6 | 32.1 | 1.5 | 75–80 | 30 | Almost. Slightly opaque. |
| 18.8 | 15.0 | 64.2 | 2.1 | 11.8 | 13.1 | 63.5 | 11.6 | 1.1 | 90–95 | 30 | No. |
| 18.8 | 30.0 | 49.4 | 1.8 | 12.2 | 26.9 | 50.2 | 10.7 | 2.2 | 90–95 | 10–12 | Yes. |
| 19.0 | 34.0 | 36.0 | 11.1 | 8.6 | 21.2 | 25.4 | 44.9 | 2.5 | 120 | 30 | No. Heavy fumes occurred. |

TABLE I-continued
NMMO - DETA - Cellulose - H₂O

DETA M. wt. 103.7
NMMO M. wt. 117.2

| Wt. % | | | | Mole % | | | | MOLE RATIO NMMO | TEMP. | TIME | |
|---|---|---|---|---|---|---|---|---|---|---|---|
| Cell. | A-O* | DETA | H₂O | Cell. | A-O | DETA | H₂O | cell. | C°. | MIN. | SOLUTIONS |
| 23.5 | 40.0 | 34.6 | 2.0 | 15.6 | 36.7 | 36.0 | 11.6 | 2.4 | 115-120 | 20 | Yes. Discolored. |
| 28.1 | 48.0 | 21.7 | 2.1 | 19.1 | 45.0 | 23.1 | 12.8 | 2.4 | 125-130 | 30 | Almost; Dark; Heavy fumes occurred. |
| 28.0 | 54.0 | 12.0 | 6.0 | 16.0 | 42.5 | 10.7 | 30.8 | 2.7 | 120 | 30 | No. Dark. |
| 28.0 | 67.0 | — | 5.0 | 16.9 | 56.0 | — | 27.1 | 3.3 | 120 | 30 | No. Dark. |
| 28.0 | 17.0 | 52.9 | 2.1 | 18.3 | 15.4 | 54.3 | 12.1 | 0.8 | 120 | 30 | No. Heavy fumes occurred. Dark. |
| 28.0 | 48.0 | 22.0 | 2.0 | 19.1 | 45.2 | 23.5 | 12.3 | 2.4 | 120 | 30 | No. Heavy fumes occurred. Dark. |
| 32.9 | 56.0 | 8.9 | 2.2 | 32.8 | 53.7 | 9.7 | 13.8 | 1.6 | 135-140 | 30 | No. Heavy fumes occurred. Dark. |

TABLE II
DMEAO - DETA - Cellulose - H₂O

DETA M. wt. 103.17
DMEAO M. wt. 105

| Wt. % | | | | Mole % | | | | MOLE RATIO DMEAO | TEMP. | TIME | |
|---|---|---|---|---|---|---|---|---|---|---|---|
| Cell. | A-O | DETA | H₂O | Cell. | A-O | DETA | H₂O | cell. | C° | MIN. | SOLUTIONS |
| 1.9 | 3.2 | 93.4 | 1.6 | 1.1 | 2.9 | 87.4 | 8.6 | 2.6 | 65-70 | 30 | No. |
| 2.8 | 4.7 | 90.7 | 1.8 | 1.7 | 4.3 | 84.6 | 9.4 | 2.6 | 65-70 | 30 | No. |
| 3.8 | 6.3 | 88.0 | 1.9 | 2.2 | 5.8 | 82.0 | 10.1 | 2.6 | 65-70 | 4-5 | Yes. Light in color. |
| 9.4 | 15.8 | 72.1 | 2.8 | 5.5 | 14.1 | 65.8 | 14.6 | 2.6 | 65-70 | 5-6 | Yes. |
| 9.4 | 13.0 | 75.3 | 2.4 | 5.6 | 11.8 | 70.0 | 12.7 | 2.1 | 70-75 | 30 | Almost. Slightly opaque. |
| 9.4 | 10.2 | 78.2 | 2.2 | 5.6 | 9.4 | 73.3 | 11.7 | 1.7 | 75-80 | 30 | Almost. Opaque. |
| 14.1 | 23.6 | 58.7 | 3.5 | 8.1 | 20.9 | 51.8 | 18.2 | 2.6 | 85-90 | 10-15 | Yes. Light in Color. Highly viscous. |
| 18.8 | 31.5 | 45.4 | 4.3 | 10.6 | 27.5 | 40.3 | 21.7 | 2.6 | 110-115 | 15-20 | Yes. Light in Color. Extra high viscosity. |
| 23.5 | 39.4 | 32.1 | 5.0 | 13.1 | 33.8 | 28.0 | 25.1 | 2.6 | 120 | 20-25 | Yes. Discolored. |
| 23.5 | 32.5 | 39.6 | 4.5 | 13.4 | 28.5 | 35.3 | 22.8 | 2.1 | 120-122 | 30 | No. Crystallized. Fumed. |
| 23.5 | 37.1 | 34.7 | 4.8 | 13.2 | 32.1 | 30.6 | 24.1 | 2.4 | 120-122 | 30 | No. Crystallized. Fumed. |
| 28.2 | 47.3 | 18.8 | 5.8 | 15.5 | 40.0 | 16.1 | 28.4 | 2.6 | 135-140 | 20 | No. Carbonized |

EXAMPLE 2

A series of solubility trials were conducted as follows

Known quantities of tertiary amine-oxide, water and the indicated amine were placed in a bottle which was then stoppered to prevent the pick up of water by the amine-oxide. The bottle was then placed in a steam bath and heated to 85° C. A number of the amines were not miscible with the amine oxide and, therefore, fall outside the scope of this invention. At this point, the bottle was removed from the steam bath and the cellulose (ground-up Buckeye V-68 woodpulp) was added to the solvent/amine mixture and stirred well. The amounts of materials were selected to provide a twenty gram total mixture. The bottle was then reclosed and returned to the bath. The mixture was observed and stirred intermittently until either a solution was achieved or the experiment was terminated.

In one series of samples, the cellulose content was 10% by weight; in a second series, 15%. In both series, the weight ratio of amine/amine oxide was varied from zero (controls) to the highest value (amine/amine oxide limit) at which the cellulose could still be dissolved. Representative results are shown below. The "B" samples represent the approximate amine/amine oxide (A/AO) limit for a given H₂O/AO ratio.

Tables III and IV summarize the results of these trials. Co-solvents within the scope of the invention appear in Table III. Results of solubility trials employing comparative materials which did not display adequate co-solvency appear in Table IV.

TABLE III

| | MIXTURE COMPOSITION | | WEIGHT RATIOS | | | | DIS-SOLV-ING | SOLUTION PROPERTIES | | |
|---|---|---|---|---|---|---|---|---|---|---|
| AMINE(A) | AMINE OXIDE | CELL. % | AO/CELL. | A/AO | H₂O/AO | H₂O/CELL. | TIME MIN. | APPEARANCE | APPARENT VISCOSITY | NO. |
| NONE (CONTROL) | NMMO | 10 | 7.9 | — | 0.14 | 1.10 | 18-20 | CLEAR | HIGH | 1 |
| | | 10 | 7.6 | — | 0.18 | 1.40 | 20-25 | CLEAR | HIGH | 2 |
| | | 15 | 5.0 | — | 0.14 | 0.72 | 18-20 | CLEAR | VERY HIGH | 3 |
| | DMEAO | 10 | 7.8 | — | 0.15 | 1.21 | 40-45 | CLEAR | HIGH | 4 |
| | | 15 | 4.9 | — | 0.16 | 0.78 | >60 | NO SOLUTION | | 5 |
| ETHYLENEDIAMINE $\frac{\#C}{\#NH_2} = 1$ | NMMO | 10 | 6.0 | 0.37 | 0.13 | 0.76 | 7-10 | CLEAR | <1 & 2 | 14A |
| | | 10 | 5.6 | 0.47 | 0.13 | 0.72 | 45-50 | CLOUDY SOLUTION | — | 14B |
| PROPANE-1,2-DIAMINE | NMMO | 10 | 3.9 | 1.12 | 0.16 | 0.64 | 5-10 | CLEAR | <<1 & 2 | 15A |

TABLE III-continued

| AMINE(A) | MIXTURE COMPOSITION | | | | | | DISSOLVING TIME MIN. | SOLUTION PROPERTIES | | NO. |
|---|---|---|---|---|---|---|---|---|---|---|
| | AMINE OXIDE | CELL. % | WEIGHT RATIOS | | | | | APPEARANCE | APPARENT VISCOSITY | |
| | | | AO/CELL. | A/AO | H₂O/AO | H₂O/CELL. | | | | |
| $\frac{\#C}{\#NH_2} = 1.5$ | | 10 | 3.2 | 1.68 | 0.17 | 0.55 | 5-10 | SL. HAZY | <1 & 2 | 15B |
| | | 15 | 3.2 | 0.60 | 0.16 | 0.52 | 5-10 | CLEAR | <<3 | 16A |
| | | 15 | 2.0 | 1.68 | 0.19 | 0.37 | 30-35 | CLOUDY | HIGH | 16B |
| PROPANE-1,3-DIAMINE | NMMO | 10 | 4.0 | 1.12 | 0.16 | 0.62 | 3-5 | CLEAR | <<1 & 2 | 17A |
| $\frac{\#C}{\#NH_2} = 1.5$ | | 10 | 3.2 | 1.68 | 0.16 | 0.52 | 2-4 | HAZY | <1 & 2 | 17B |
| | | 15 | 3.7 | 0.37 | 0.15 | 0.56 | 3-5 | CLEAR | <<3 | 18A |
| | | 15 | 2.0 | 1.68 | 0.18 | 0.35 | 5-8 | HAZY | <3 | 18B |
| | DMEAO | 10 | 4.1 | 1.08 | 0.11 | 0.46 | 5-8 | CLEAR | <<4 | 19A |
| | | 10 | 3.3 | 1.62 | 0.12 | 0.39 | 10-15 | CLEAR | <4 | 19B |
| HEXAMETHYLENE-DIAMINE | NMMO | 10 | 5.9 | 0.37 | 0.15 | 0.88 | 6-12 | CLEAR | <<1 & 2 | 20A |
| | | 10 | 5.1 | 0.60 | 0.16 | 0.80 | 6-12 | CLEAR | <<1 & 2 | 20B |
| $\frac{\#C}{\#NH_2} = 3$ | | 10 | 5.1 | 0.58 | 0.17 | 0.86 | 5-7 | CLEAR | <<1 & 2 | 21A |
| | | 10 | 4.7 | 0.79 | 0.18 | 0.82 | 8-12 | SL. HAZY | <<1 & 2 | 21B |
| | | 15 | 3.7 | 0.37 | 0.15 | 0.56 | 6-10 | CLEAR | HIGH | 22A |
| | | 15 | 3.2 | 0.60 | 0.16 | 0.50 | 15-20 | CLEAR | HIGH | 22B |
| 1,3-BIS(AMINOMETHYL) CYCLOHEXANE | NMMO | 10 | 5.9 | 0.37 | 0.15 | 0.88 | 18-20 | CLEAR | <<1 & 2 | 23A |
| | | 10 | 5.1 | 0.60 | 0.15 | 0.78 | 35-40 | CLOUDY | <<1 & 2 | 23B |
| $\frac{\#C}{\#NH_2} = 4$ | | | | | | | | | | |
| 1,4-DI(AMINOMETHYL) CYCLOHEXANE | NMMO | 10 | 5.9 | 0.38 | 0.15 | 0.88 | 18-20 | CLEAR | <<1 & 2 | 24A |
| | | 10 | 5.1 | 0.60 | 0.15 | 0.78 | 30-35 | CLOUDY | <1 & 2 | 24B |
| $\frac{\#C}{\#NH_2} = 4$ | | | | | | | | | | |
| DIETHYLENE-TRIAMINE | NMMO | 10 | 2.0 | 3.38 | 0.17 | 0.35 | 16-18 | CLEAR | <<1 & 2 | 31A |
| | | 10 | 1.6 | 4.50 | 0.18 | 0.28 | 18-20 | HAZY | <1 & 2 | 31B |
| $\frac{\#C}{\#NH_2} = 2$ | | 10 | 1.9 | 3.51 | 0.21 | 0.41 | 15-20 | CLEAR | <<1 & 2 | 32A |
| | | 10 | 1.5 | 4.69 | 0.23 | 0.36 | 20-24 | SL. HAZY | <1 & 2 | 32B |
| | | 15 | 2.0 | 1.69 | 0.17 | 0.34 | 18-20 | CLEAR | <<3 | 33A |
| | | 15 | 1.5 | 2.62 | 0.18 | 0.27 | 20-25 | SL. HAZY | <<3 | 33B |
| $\frac{\#NH_2}{\#NHR} = 2$ | DMEAO | 10 | 3.9 | 1.14 | 0.17 | 0.65 | 8-12 | CLEAR | <<4 | 34A |
| | | 10 | 3.5 | 4.57 | 0.20 | 0.31 | 30-35 | CLEAR | <4 | 34B |
| | | 15 | 2.0 | 1.71 | 0.19 | 0.36 | 15-20 | CLEAR | HIGH | 35A |
| | | 15 | 1.5 | 2.66 | 0.20 | 0.29 | 15-20 | HAZY | HIGH | 35B |
| H₂N(CH₂)₂NH(CH₂)₃NH₂ | NMMO | 10 | 6.0 | 0.36 | 0.13 | 0.81 | 4-5 | CLEAR | HIGH | 36A |
| $\frac{\#C}{\#NH_2} = 2.5$ | | 10 | 3.2 | 1.62 | 0.18 | 0.55 | 40-45 | CLEAR | <1 & 2 | 36B |
| $\frac{\#NH_2}{\#NHR} = 2$ | | | | | | | | | | |
| DIPROPYLENE-TRIAMINE | NMMO | 10 | 5.7 | 0.39 | 0.18 | 1.05 | 10-11 | CLEAR | <1 & 2 | 39A |
| | | 10 | 3.8 | 1.16 | 0.19 | 0.73 | 10-13 | SL. HAZY | <1 & 2 | 39B |
| $\frac{\#C}{\#NH_2} = 3$ | DMEAO | 10 | 3.9 | 1.15 | 0.18 | 0.68 | 5-8 | CLEAR | <<4 | 40A |
| | | 10 | 3.1 | 1.74 | 0.19 | 0.55 | 7-11 | SL. HAZY | <<4 | 40B |
| $\frac{\#NH_2}{\#NHR} = 2$ | | | | | | | | | | |
| TRIETHYLENE-TETRAAMINE | NMMO | 10 | 6.7 | 0.17 | 0.15 | 1.00 | 5-8 | SL. HAZY | — | 41A |
| | | 10 | 5.9 | 0.38 | 0.15 | — | 8-10 | SL. HAZY | — | 41B |
| $\frac{\#C}{\#NH_2} = 3$ | | | | | | | | | | |
| $\frac{\#NH_2}{\#NHR} = 1$ | | | | | | | | | | |

TABLE IV

| AMINE (A) | MIXTURE COMPOSITION | | | | | | DISSOLVING TIME MIN. | SOLUTION PROPERTIES | | NO. |
|---|---|---|---|---|---|---|---|---|---|---|
| | AMINE OXIDE | CELL. % | WEIGHT RATIOS | | | | | APPEARANCE | APPARENT VISCOSITY | |
| | | | AO/CELL. | A/AO | H₂O/AO | H₂O/CELL. | | | | |
| CYCLOHEXYLAMINE | NMMO | 10 | 6.7 | 0.17 | 0.15 | 1.00 | 18-20 | PARTIAL SOLUTION | — | 6 |
| $\frac{\#C}{\#NH_2} = 6$ | | 10 | 5.9 | 0.38 | 0.15 | 0.88 | >60 | 2-PHASE SYSTEM | — | 7 |
| DIMETHYL-ETHANOLAMINE | NMMO | 10 | 6.7 | 0.17 | 0.15 | 1.00 | 6-10 | VERY CLOUDY SOLUTION | HIGH | 8 |
| $\frac{\#C}{\#NH_2} = \infty$ | | 10 | 5.9 | 0.38 | 0.15 | 0.88 | >60 | NO SOLUTION | — | 9 |
| N-METHYLMORPHOLINE | NMMO | 10 | 6.9 | 0.16 | 0.15 | 1.00 | 10-15 | 2-PHASE SYSTEM | HIGH | 10 |
| $\frac{\#C}{\#NH_2} = \infty$ | | 10 | 5.9 | 0.38 | 0.15 | 0.88 | 10-15 | 2-PHASE SYSTEM | HIGH | 11 |

TABLE IV-continued

| AMINE (A) | AMINE OXIDE | CELL. % | AO/CELL. | A/AO | H₂O/AO | H₂O/CELL | DISSOLVING TIME MIN. | APPEARANCE | APPARENT VISCOSITY | NO. |
|---|---|---|---|---|---|---|---|---|---|---|
| TRIETHYLAMINE | NMMO | 10 | 6.9 | 0.16 | 0.14 | 1.00 | 20-25 | 2-PHASE SYSTEM | — | 12 |
| #C/#NH₂ = ∞ | | 10 | 5.9 | 0.38 | 0.15 | 0.88 | 20-25 | 2-PHASE SYSTEM | — | 13 |
| SYM. DIETHYL-ETHYLENEDIAMINE | NMMO | 10 | 6.9 | 0.16 | 0.15 | 1.01 | 5-10 | 2-PHASE SYSTEM | HIGH | 25 |
| #C/#NH₂ = ∞ | | 10 | 5.9 | 0.37 | 0.15 | 0.90 | 5-10 | 2-PHASE SYSTEM | HIGH | 26 |
| UNSYM. DIMETHYL-PROPYLENE-DIAMINE | NMMO | 10 | 6.9 | 0.16 | 0.15 | 1.00 | 15-20 | 2-PHASE SYSTEM | HIGH | 27 |
| | | 10 | 5.9 | 0.38 | 0.15 | 0.88 | 20-25 | 2-PHASE SYSTEM | HIGH | 28 |
| #C/#NH₂ = 5 | | | | | | | | | | |
| SYM. DIMETHYL-HEXAMETHYLENE-DIAMINE | NMMO | 10 | 6.9 | 0.16 | 0.14 | 1.00 | 5-10 | 2-PHASE SYSTEM | HIGH | 29 |
| | | 10 | 5.9 | 0.38 | 0.15 | 0.87 | 5-10 | 2-PHASE SYSTEM | HIGH | 30 |
| #C/#NH₂ = ∞ | | | | | | | | | | |
| SYM. DIMETHYL-PROPYLENE-DIAMINE | NMMO | 10 | 6.9 | 0.16 | 0.15 | 1.01 | 6-10 | 2-PHASE SYSTEM | HIGH | 37 |
| | | 10 | 5.9 | 0.37 | 0.15 | 0.89 | 5-10 | 2-PHASE SYSTEM | HIGH | 38 |
| #C/#NH₂ = ∞ | | | | | | | | | | |

EXAMPLE 3

Known quantities of N-methyl morpholine N-oxide (NMMO) co-solvent (as stated) and 10% or 15% (wt.) cellulose (Buckeye V-68, ½ mm grind) were added to an Atlantic Research mixer at the same time. A control sample (10% cellulose) without a co-solvent was also prepared. Each mixture was heated at 85° C. and stirred constantly until a solution was achieved, approximately 20 minutes. The solution point was determined by the clarity and drawability of the solution.

Upon achieving a solution, the sample was deaired by using a vacuum of about 23 in Hg for 10 minutes. At the end of this period, the sample was extruded into an appropriate dish with a ground glass stopper and placed in the oven at 85° C. for 5 minutes to allow the sample to settle. The viscosity of each sample was then determined using a Brookfield viscometer at different spindle speeds. The viscosity in centipoises (cp.) of the solution was calculated at each speed and the average of these values is reported in Table V.

TABLE V

| Solution # | Cellulose % | Co-Solvent | Co-Solvent % | Viscosity (cp.) |
|---|---|---|---|---|
| 1 | 10 | None | | 2,000,000+ |
| 2 | 10 | DETA | 22 | 220,000 |
| 3 | 10 | DETA | 45 | 101,000 |
| 4 | 15 | DETA | 21 | 2,000,000+ |
| 5 | 15 | DETA | 42 | 1,400,000 |
| 6 | 10 | 1,4-CHBMA | 22 | 352,000 |
| 7 | 10 | 1,2-DAP | 22 | 105,000 |
| 8 | 10 | 1,2-DAP | 45 | 47,000 |
| 9 | 15 | 1,2-DAP | 22 | 830,000 |
| 10 | 15 | 1,2-DAP | 43 | 570,000 |
| 11 | 10 | HMD | 22 | 188,000 |
| 12 | 10 | HMD | 45 | 135,000 |
| 13 | 15 | HMD | 22 | 850,000 |
| 14 | 15 | HMD | 35 | 670,000 |

DETA = Diethylenetriamine
1,4-CHBMA = 1,4-Cyclohexan
1,2-DAP = 1,2-Diaminopropabis(methylamine)
HMD = Hexamethylenediamine

EXAMPLE 4

Various amounts of cellulose (V-68) were dissolved in a N-methylmorpholine oxide/methoxyethylamine/water mixture. The amine oxide, amine and the cellulose were stirred in a closed system (Atlantic Research mixer) at a maximum of 89° C. to avoid loss of amine up to 45 minutes or until the cellulose dissolved. In sample No. 1, however, after 30 minutes, as noted in Table VII, the temperature was increased up to 92° C., at which time the amine boiled out without dissolving the cellulose. The results of the twelve samples prepared as above are found in Table VI.

TABLE VI

Methoxyethylamine (MEA)—NMMO—H₂O—Cellulose (V-68) Solutions
NMMO Cont. 2.5% H₂O
MEA Cont. 0.54% H₂O, Bp. 95° C. - M. Wt. 75.1
V-68 Cont. 6% H₂O

| NO. | A-O g. | MEA g. | V-68 g. | ADDED H₂O g. | COMPOSITION IN WT. % A-O % | MEA % | CELL. % | H₂O % | COMPOSITION IN MOLE % A-O M % | MEA M % | CELL. M % | H₂O M % |
|---|---|---|---|---|---|---|---|---|---|---|---|---|
| 1 | 10 | 10 | 0.4 | — | 47.8 | 48.8 | 1.8 | 1.6 | 35.2 | 56.1 | 1.0 | 7.8 |

TABLE VI-continued

Methoxyethylamine (MEA)—NMMO—H$_2$O—Cellulose (V-68) Solutions
NMMO Cont. 2.5% H$_2$O
MEA Cont. 0.54% H$_2$O, Bp. 95° C. - M. Wt. 75.1
V-68 Cont. 6% H$_2$O

|   |    |    |     |     |      |      |      |      |      |      |     |      |
|---|----|----|-----|-----|------|------|------|------|------|------|-----|------|
|   |    |    |     |     | 0.4  | 0.6  | 0.0  | 0.1  |      |      |     |      |
| 2 | 10 | 10 | 0.4 | 2.0 | 43.5 | 44.4 | 1.7  | 10.4 | 24.0 | 38.2 | 0.7 | 37.3 |
|   |    |    |     |     | 0.4  | 0.6  | 0.0  | 0.6  |      |      |     |      |
| 3 | 10 | 10 | 1.0 | 2.0 | 42.4 | 43.2 | 4.1  | 10.3 | 23.6 | 37.5 | 1.6 | 37.3 |
|   |    |    |     |     | 0.4  | 0.6  | 0.3  | 0.6  |      |      |     |      |
| 4 | 10 | 10 | 1.0 | 1.0 | 44.3 | 45.2 | 4.3  | 6.2  | 28.0 | 44.6 | 1.9 | 25.6 |
|   |    |    |     |     | 0.4  | 0.6  | 0.0  | 0.3  |      |      |     |      |
| 5 | 10 | 10 | 2.0 | 1.0 | 42.4 | 43.2 | 8.2  | 6.2  | 27.1 | 43.2 | 3.8 | 25.9 |
|   |    |    |     |     | 0.4  | 0.6  | 0.1  | 0.3  |      |      |     |      |
| 6 | 10 | 10 | 3.4 | 1.0 | 40.0 | 40.8 | 13.1 | 6.2  | 26.1 | 41.5 | 6.1 | 26.3 |
|   |    |    |     |     | 0.3  | 0.5  | 0.1  | 0.3  |      |      |     |      |
| 7 | 10 | 10 | 4.0 | 0.5 | 39.8 | 40.6 | 15.4 | 4.2  | 28.0 | 44.7 | 7.8 | 19.5 |
|   |    |    |     |     | 0.3  | 0.5  | 0.1  | 0.2  |      |      |     |      |
| 8 | 10 | 10 | 3.4 | 0.8 | 40.3 | 41.1 | 13.2 | 5.4  | 27.0 | 43.0 | 6.4 | 23.6 |
|   |    |    |     |     | 0.3  | 0.5  | 0.1  | 0.3  |      |      |     |      |
| 9 | 10 | 10 | 4.0 | 0.8 | 39.3 | 40.1 | 15.2 | 5.4  | 26.6 | 42.2 | 7.4 | 23.9 |
|   |    |    |     |     | 0.3  | 0.5  | 0.1  | 0.3  |      |      |     |      |
| 10| 10 | 12 | 3.5 | 0.9 | 36.9 | 45.2 | 12.5 | 5.4  | 24.4 | 46.5 | 5.9 | 23.2 |
|   |    |    |     |     | 0.3  | 0.6  | 0.1  | 0.3  |      |      |     |      |
| 11| 10 | 10 | 1.1 | 1.2 | 43.7 | 44.6 | 4.6  | 7.0  | 26.9 | 42.8 | 2.0 | 28.2 |
|   |    |    |     |     | 0.4  | 0.6  | 0.0  | 0.4  |      |      |     |      |
| 12| 10 | 15 | 0.5 | 2.0 | 35.5 | 54.3 | 1.7  | 8.6  | 20.0 | 47.8 | 0.7 | 31.6 |
|   |    |    |     |     | 0.3  | 0.7  | 0.0  | 0.5  |      |      |     |      |

| NO. | MOLE RATIOS A-O/CELL. | MOLE RATIOS MEA/A-O | TEMP. C.° | CELL. SOLUTION TIME MIN. | CELL. SOLUTION SOLUTION | COLOR |
|-----|------|-----|----|----|--------|-------|
| 1   | 37.0 | 1.6 | 85 | 30 | No     | —     |
| 2   | 36.9 | 1.6 | 85 | 15 | Yes    | Light |
| 3   | 14.5 | 1.6 | 85 | 40 | No     | Light |
| 4   | 14.5 | 1.6 | 85 | 20 | Yes    | Light |
| 5   | 7.2  | 1.6 | 85 | 20 | Yes    | Light |
| 6   | 4.3  | 1.6 | 89 | 40 | No     | Light |
| 7   | 3.6  | 1.6 | 89 | 45 | No     | Light |
| 8   | 4.2  | 1.6 | 89 | 45 | Yes    | Light |
| 9   | 3.6  | 1.6 | 89 | 45 | No     | Light |
| 10  | 4.2  | 1.9 | 89 | 40 | Almost | Light |
| 11  | 13.3 | 1.6 | 85 | 20 | Yes    | Light |
| 12  | 30.3 | 2.4 | 85 | 40 | No     | Light |

What is claimed is:

1. A solution comprising:
   (a) cellulose;
   (b) a tertiary amine N-oxide solvent for said cellulose;
   (c) a cellulose solubility-enhancing amount of water;
   (d) a solution processability-enhancing amount of a co-solvent, miscible with said tertiary amine N-oxide, selected from compounds containing primary, or combinations of primary and secondary, amino groups wherein the amino groups are bonded to alkyl, alicyclic, alkyl ether or alkyl/alicyclic radical(s) and wherein the number of carbon atoms divided by the number of primary amine groups is approximately equal to or less than 4, and the number of primary amine groups divided by the number of secondary amine groups is equal to or greater than 1.

2. The cellulose solution of claim 1, containing from about 5% to about 20% by weight cellulose, wherein the ratio by weight of amine oxide to cellulose is greater than 1.2; the weight ratio of co-solvent to amine oxide is from about 0.05 to about 10; the weight ratio of water to amine oxide is less than 0.4; and said solution is prepared at a temperature of less than about 125° C.

3. The cellulose solution of claim 2, which is prepared at less than about 100° C.

4. The solution of claim 2, wherein the co-solvent is a polyamine.

5. The solution of claim 4, wherein the polyamine comprises C, H & N.

6. The solution of claim 4, wherein the polyamine contains ether linkages.

7. The solution of claim 5, wherein the polyamine is selected from the group consisting of 1,3-bis-(aminomethyl) cyclohexane, dipropylenetriamine, 1,2-diaminopropane, 1,3-diaminopropane, diethylenetriamine and hexamethylenediamine.

8. The solution of claim 1, wherein the boiling point of said co-solvent is at least ±15° C. different from a medium intended to be employed as a shaped solution processing medium.

9. A method of forming a shaped article which comprises shaping the solution of claims 1, 2, 3, 4, 5, 6, 7 or 8 and precipitating the cellulose from the shaped solution to form a shaped cellulose article.

10. The solution of claim 4, wherein the polyamine contains less than about 15 carbon atoms.

* * * * *